MEANS FOR FREEZING EXPOSURE OF SALT WATER PURIFICATION SYSTEM

Original Filed Jan. 30, 1961 2 Sheets-Sheet 1

INVENTOR.
John Hans Davids
BY George A. Woodruff
Atty.

MEANS FOR FREEZING EXPOSURE OF SALT WATER PURIFICATION SYSTEM

Original Filed Jan. 30, 1961 2 Sheets-Sheet 2

INVENTOR.
John Hans Davids
BY
George A. Woodruff
Atty.

United States Patent Office

Re. 25,940

Reissued Dec. 14, 1965

25,940

MEANS FOR FREEZING EXPOSURE OF SALT WATER PURIFICATION SYSTEM

John Hans Davids, Beloit, Wis., assignor, by mesne assignments, to Desalination Plants (Developers of Zarchin Process) Limited, Tel Aviv, Israel, an Israel company Original No. 3,103,792, dated Sept. 17, 1963, Ser. No. 85,522, Jan. 30, 1961. Application for reissue Feb. 12, 1964, Ser. No. 354,195

9 Claims. (Cl. 62—123)

Matter enclosed in heavy brackets [ ] appears in the original patent but forms no part of this reissue specification; matter printed in italics indicates the additions made by reissue.

This invention relates to improvements in a system for providing purified or potable water from sea water or other brackish liquids and the like, and is concerned in particular with improved means for effecting maximum freezing exposure of the liquid to be purified, in a system of the vacuum freezing type.

The present improvement is especially suitable for embodiment in a vacuum freezing system wherein raw liquid to be rendered potable, is first cooled to a relatively low temperature and then delivered to a confined region or chamber under sub-atmospheric pressure wherein the cooled liquid undergoes freezing. The result in the freezing chamber or region is the formation of an ice and brine mixture and water vapor. The mixture then is conveyed to a separator wherein the ice is separated from the brine, followed by delivery of the separated ice to a confined melting region which is maintained under sub-atmospheric pressure. Water vapor formed in the freezing region is conveyed by a compressor into the melting region where the compressed vapor condenses on the ice and at the same time melts the ice, thus resulting in fresh or potable water. In a system as above outlined, it is highly important to the effectiveness and efficiency of the system, to have maximum freezing exposure of the raw liquid within the confines of the freezing region. Accordingly, it is the principal object of the present invention to provide improved delivery of raw liquid into the freezing region in a manner and by means affording maximum freezing exposure of the raw liquid therein.

Another object is to provide in the freezing chamber of a system as indicated, large flow surface areas effective for securing maximum freezing exposure of raw liquid admitted to the chamber.

The foregoing and other objects and advantages will appear from the following description of a presently preferred embodiment of the invention, as such is illustrated by the accompanying drawings wherein.

Figure 1:
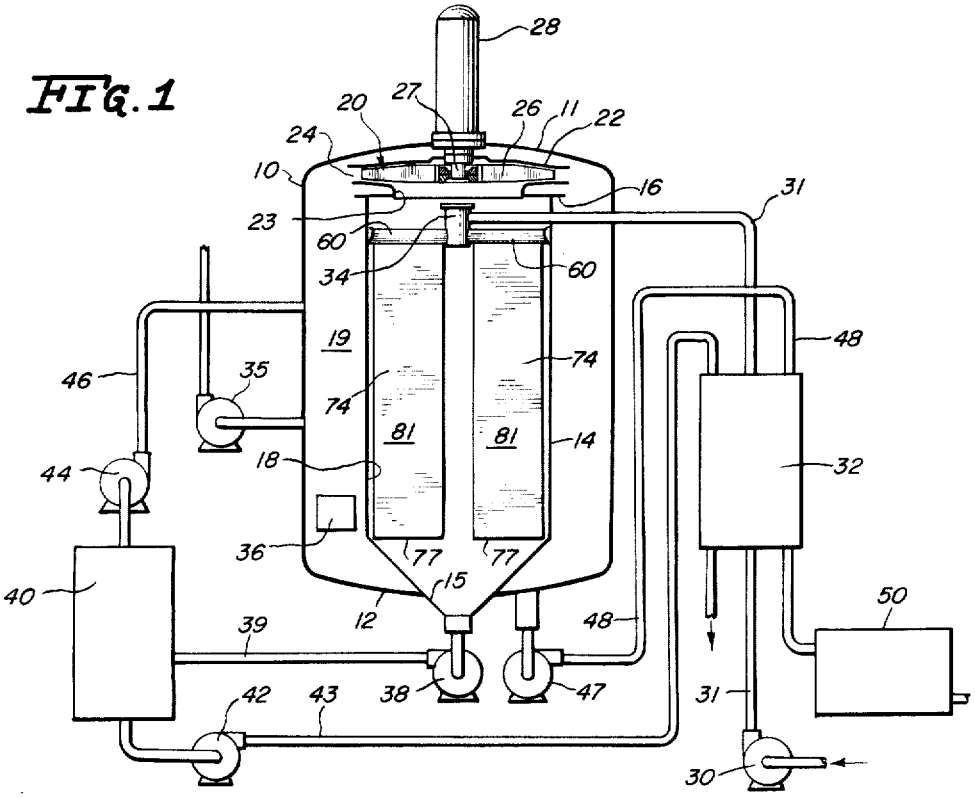
FIG. 1 is a diagrammatic view of a system for rendering sea water or the like potable, showing the present improvements applied thereto.

As illustrated diagrammatically in FIG. 1, the system includes a cylindrical member or tank 10 having top wall 11 and bottom wall 12, and an inner tank 14 generally co-axial with tank 10 having a converging bottom wall 15 and an aperture top wall 16. The chamber 18 of inner tank 14 constitutes the freezing chamber of the system, while the melting chamber is in outer tank 10, being the chamber space 19 between the walls of the two tanks. Suitably mounted in the top zone of chamber

19 is a compressor unit 20 illustrated as an axial intake, radial dicharge compressor. It includes a casing 22 providing an axial intake portion 23 extending through the apertured top wall 16 of tank 14, and discharge outlet 24 extending peripherally of the casing and in open communication with chamber 19. In the casing is the compressor rotor 26, on a drive shaft 27 driven by an electric motor 28 on the top wall 11 of tank 10.

In the system shown, raw saline solution or liquid from a source of sea water or other brine or brackish liquid, is delivered by a pump 30 through line 31 which passes through a suitable heat exchanger 32 of a capacity to effect cooling of the raw liquid to a relatively low temperature, as about 30° F. Line 31 extends through chamber 19 into the freezing chamber 18, to a manifold 34 located centrally in the upper end portion of the chamber, from which raw liquid is delivered into the freezing chamber by improved means to be described hereinafter.

The pressure in melting chamber 19 is established and maintained by a vacuum pump 35 at a predetermined sub-atmospheric pressure of the order of 4.6 mm. of mercury. In consequence of the low pressure in chamber 19 and the compressor 20 in full operation, the pressure in the freezing chamber 18 is established at a sub-atmospheric value of the order of 3.2 mm. of mercury. In operation of the system, a temperature of the order of 32° F. obtains in the chamber 19 which receives ice for melting therein, while the temperature in chamber 18 will be at least correspondingly low and normally in the order of 25° F. with continued liquid freezing therein. Included in chamber 19 is a suitable refrigerating unit 36 for excess heat removal, the unit serving to condense some part of the vapor delivered into chamber 19 by the compressor 20.

The chamber 18 thus affords a low temperature, high vacuum confined region. Consequently and in known manner, the cooled raw liquid admitted into chamber 18 (in the manner and by means to appear), undergoes freezing or so-called "flash freezing" resulting in the substantially pure water vapor and the formation of a slush or mixture of ice crystals and brine. As the water vapor forms, it is withdrawn by the compressor 20 and delivered thereby into the melting chamber 19 for use therein as will appear presently. The ice-brine mixture is withdrawn from the bottom zone of the freezing chamber 18 by a suitable pump 38, and delivered thereby over line 39 to a separator unit 40. In unit 40 gravitational separation of ice and brine takes place, the ice floating upwardly in the brine and the brine concentrating in the lower region of the unit. Brine is withdrawn by pump 42 and delivered over line 43 through the heat exchanger 32 to waste, the cold brine assisting in cooling the incoming raw liquid. Ice crystals separated in unit 40, then are conveyed by pump 44 and line 46 into the melting chamber 19. The compressed water vapor from the compressor 20, condenses on the ice in chamber 19 and causes melting of the ice, thus resulting in fresh or potable water which collects in the lower region of the chamber. Potable water is withdrawn by pump 47 over line 48 to a suitable storage tank 50 (or to points of use), the line passing through heat exchanger 32 to assist in cooling the incoming raw liquid.

As before noted, it is important to the effectiveness and efficiency of the freezing function in the system, to afford maximum freezing exposure of the raw liquid in chamber 18. To such end, the present invention provides an improved raw liquid distributor arrangement including the heretofore mentioned manifold 34, now to be described.

Figure 4:
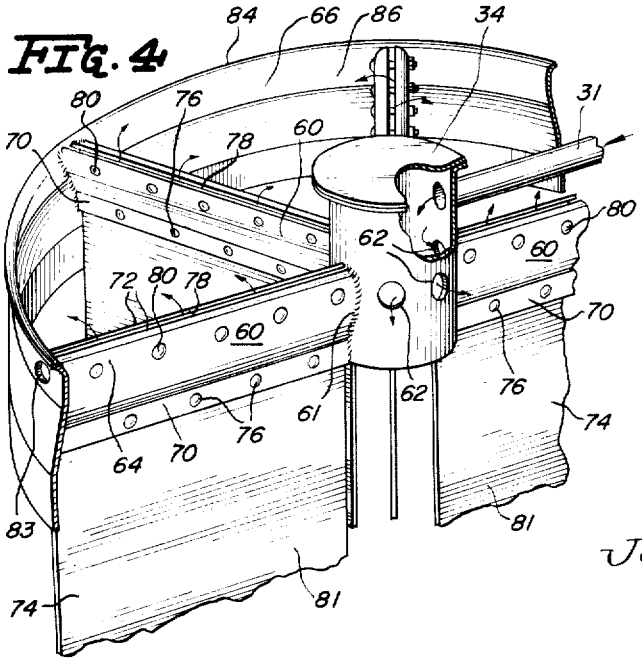
FIG. 4 is an enlarged fragmentary oblique view of the admission means.
Figure 3:
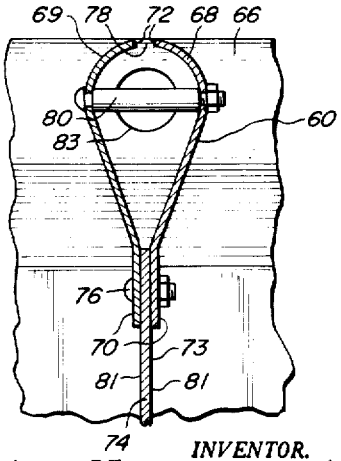
FIG. 3 is an enlarged transverse sectional view of the admission means, as taken from line 3—3 in FIG. 2.
Figure 2:
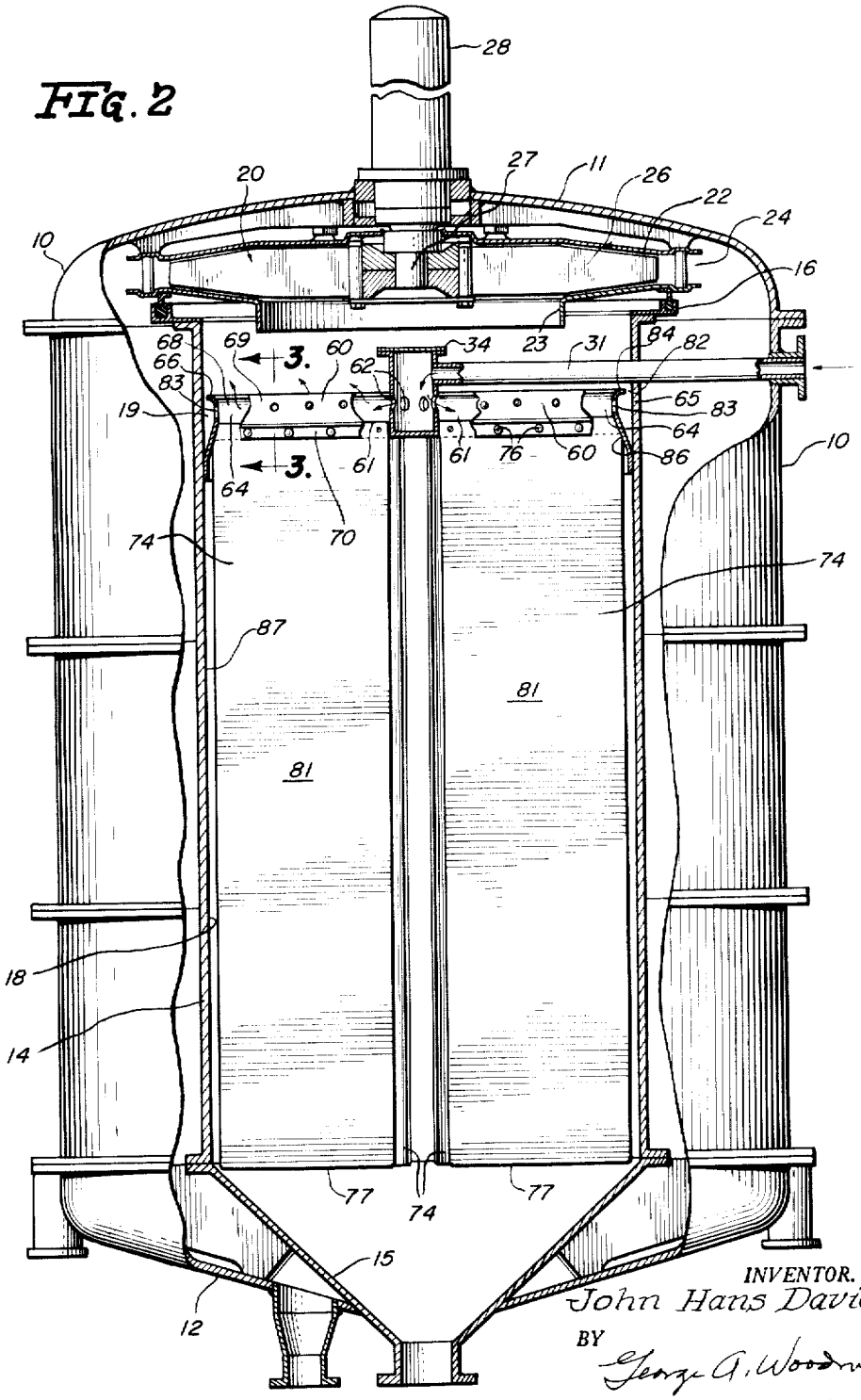
FIG. 2 is an enlarged sectional view of the freezing chamber portion of such system, showing details of the raw liquid admission means and flow surface areas of the present invention.

Referring to FIGS. 2, 3 and 4 in particular, the manifold 34 located centrally of the freezing chamber inwardly adjacent its upper end wall 16, carries a plurality of conduits or elongated hollow members 60 which radiate substantially horizontally therefrom, in the manner of spokes of a wheel. Each member 60 has its inner end 61 communicating with the manifold interior through a manifold port 62, and its outer end 64 terminating adjacent the freezing chamber wall portion 65 and supported thereon by a suitable annular bracket 66, the bracket extending over the outer ends of the members 60. As shown in FIGS. 3 and 4, each member 60 is comprised of complemental halves 68 and 69 formed of corrosion resistant material, each half providing a lower marginal flange 70 longitudinally thereof, and an upper longitudinal margin 72. In assembly, the halves have clamped between the flanges 70 thereof the upper horizontal margin 73 of a sheet-like member or plate 74 formed from suitable corrosion-resistant thin sheet stock, as stainless steel sheet. Such plate secured to the flanges 70 as by bolts 76, thus depends from the member 60 in chamber 18, in a plane which includes the longitudinal axis of the assembled member 60. The width of the plate corresponds substantially to the length of member 60, while the plate length is such as to have its lower terminal margin 77 (FIG. 2) adjacent the bottom wall 15 of the chamber 18. The suspended plate thus has a length less than but approaching the vertical height of the chamber 18, and so presents large surface areas.

Further, each member 60 in assembly has the upper margins 72 of the halves spaced apart to define a relatively narrow, elongate discharge opening or port 78. Spacing of the halves for this purpose, is maintained by a plurality of spacer studs 80 spanning the halves 68 and 69 internally of the member. The members 60 are structurally joined to the manifold 34 in any suitable manner, as by welding or the like, and similarly joined to bracket 66. In addition, the bracket 66 forms with the adjacent wall portion 65 of tank 14 (FIG. 2) an annular, upwardly opening channel 82. Each member 60 communicates with such channel through a port or opening 83 in the bracket (FIGS. 2, 3 and 4), to admit raw liquid for flow in the channel and therefrom over the upper edge 84 of the bracket and downwardly along the inner bracket surface 86.

In operation of the system embodying the distributor as now described, raw liquid delivered to the manifold 34 passes into and along each member 60, the liquid issuing in discharge upwardly through the port 78 of each member. As so discharged, the liquid flows over and downwardly of the halves 68 and 69 onto the surfaces 81 of the associated plate 74, flowing downwardly on these surfaces. Thus, the raw liquid flowing over the members 60 and downwardly on the plates 74, is distributed over large surface areas afforded by the improved distributor device, and thereby given maximum exposure to freezing in the chamber. Such exposure is here increased by admission of raw liquid to channel 82 through ports 83, the liquid passing from the channel over the upper edge 84 of bracket and downwardly along the inner bracket surface 86. Such flow continues from the bracket onto the inner surface 87 of the tank 14 and downwardly thereover.

Having now described and illustrated the present invention with respect to a preferred embodiment thereof, it is to be understood that changes and modifications may be made thereto without departing from the spirit and scope of the invention as hereinafter defined.

What is claimed is:

1. In a vacuum freezing system for rendering saline liquid potable, a freezing chamber, supply means for delivering saline liquid to the chamber, and means for distributing saline liquid received from the supply means, said means including a saline liquid conduit extending substantially horizontally in the chamber, a solid sheet member depending in the chamber from the region of the conduit, and said conduit providing port means for the discharge of saline liquid onto said sheet member.

2. In a vacuum freezing system for rendering saline liquid potable, a freezing chamber, supply means for delivering saline liquid to the chamber, an elongate hollow member arranged substantially horizontally in the chamber and in saline liquid receiving connection to said supply means, a solid sheet member carried by said hollow member in depending position in the chamber, and said hollow member having an opening extending along its upper side for the discharge of saline liquid therethrough, the discharged saline liquid flowing externally over the hollow member and onto said sheet member.

3. In a vacuum freezing system for rendering saline liquid potable, a freezing chamber, supply means for delivering saline liquid to the chamber, a two-part elongate hollow member supported in the chamber in a horizontal position therein and having saline liquid receiving connection to said supply means, a solid sheet member depending in the chamber from said hollow member with its upper margin between the lower longitudinal margins of the two-part hollow member and secured thereto, and said hollow member providing a top opening lengthwise thereof, for the discharge of saline liquid therethrough, the discharged saline liquid flowing externally over the hollow member and downwardly along the surfaces of said sheet member.

4. In a vacuum freezing system for rendering saline liquid potable, a freezing chamber, supply means for delivering saline liquid to the chamber, said supply means including a manifold in the chamber, a plurality of elongate hollow members projecting from said manifold substantially horizontally in the chamber and each in saline fluid receiving communication with said manifold, a solid sheet member carried by each hollow member in depending relation in the chamber, and each hollow member having port means for the discharge of saline liquid onto its associated sheet member.

5. In a vacuum freezing system for rendering saline liquid potable, means providing a vertically elongate freezing chamber, supply means for the delivery of saline liquid to the chamber, said supply means including a manifold centrally, carried within the chamber near its upper end, a plurality of elongate hollow members radiating horizontally from the manifold and in saline liquid receiving communication therewith, plate members of thin sheet material carried by said hollow members in suspension therefrom in the chamber, said plate members each terminating adjacent the lower end of the said chamber, and said hollow members each having port means for the discharge of saline liquid onto its associated plate member.

6. In a vacuum freezing system for rendering saline liquid potable, means providing a vertically elongate freezing chamber, supply means for the delivery of saline liquid to the chamber, said supply means including a manifold centrally carried within the upper end of said chamber, a plurality of elongate hollow members radiating horizontally from the manifold and in saline liquid receiving communication therewith, a plurality of plate members of thin sheet material, carried by the hollow members in suspension therefrom and terminating adjacent the lower end of the chamber, each plate member being in the plane of the longitudinal axis of its associated hollow member, and said hollow members each providing an upwardly opening port extending longitudinally thereof for the discharge of saline liquid, the discharged liquid flowing from the port downwardly about the hollow member and downwardly over the surfaces of the associated plate member.

7. In a vacuum freezing system for rendering saline liquid potable, tank means providing a freezing chamber, supply means for delivering saline liquid to the chamber, said supply means including a manifold in the chamber, a channel member mounted on the inner wall surface of the tank and forming a channel in the chamber, a plurality of hollow members between said manifold and said channel member and each in saline fluid receiving communication with said manifold, a sheet-like member in depending relation to each hollow member, each hollow member having port means for the discharge of saline liquid onto its associated sheet-like member, and at least one of said hollow members communicating with said channel formed by said channel member for the delivery of saline liquid thereto, saline liquid discharging from the channel onto the inner wall surface of said tank.

8. In a vacuum freezing system for rendering saline liquid potable, tank means having an inner substantially vertical wall surface, providing a freezing chamber, supply means for delivering saline liquid to the chamber, said supply means including a manifold carried in the chamber, hollow members projecting from said manifold and each in saline liquid receiving communication therewith, a bracket member supporting said hollow members on the inner wall surface of the tank, said bracket member forming with the adjacent portion of said inner wall surface, an upwardly open channel, sheet-like members carried by said hollow members in dependence therefrom in the chamber, each hollow member providing port means for the discharge of saline liquid onto its associated sheet-like member, and port means in said bracket opening said hollow members to said channel for the delivery of saline liquid thereinto, saline liquid discharging from the channel upwardly over the bracket member and thence downwardly thereover onto said inner wall surface of the tank.

*9. In a vacuum freezing system for rendering saline liquid potable, tank means having an inner substantially vertical wall surface and providing a freezing chamber, a bracket member carried by the wall of said tank means and forming an upwardly open channel, and supply means for delivering saline liquid to said channel, saline liquid discharging from said channel upwardly over said bracket member and then downwardly onto said inner wall surface of said tank means.*

References Cited by the Examiner

The following references, cited by the Examiner, are of record in the patented file of this patent or the original patent.

UNITED STATES PATENTS 2,616,670 11/1952 Van Der Molen ----- 165—115

FOREIGN PATENTS 985,905 11/1951 France.

OTHER REFERENCES

Publication: "Development of a Direct Freezing Wash-Separation Process for Saline Water Conversion," Carrier Corporation, Report Number 23, January 1959, pages 1–3 and FIGURES 1 and 2.

ROBERT A. O'LEARY, *Primary Examiner.*